United States Patent
Dhurjati et al.

(10) Patent No.: US 8,468,499 B2
(45) Date of Patent: Jun. 18, 2013

(54) DIRECTED TESTING FOR PROPERTY VIOLATIONS

(75) Inventors: Dinakar Dhurjati, Sunnyvale, CA (US); Ajay Chander, San Francisco, CA (US); Hiroshi Inamura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 619 days.

(21) Appl. No.: 12/722,404

(22) Filed: Mar. 11, 2010

(65) Prior Publication Data

US 2011/0072417 A1   Mar. 24, 2011

Related U.S. Application Data

(60) Provisional application No. 61/160,464, filed on Mar. 16, 2009.

(51) Int. Cl.
*G06F 9/44* (2006.01)
*G06F 9/45* (2006.01)

(52) U.S. Cl.
USPC ............................ 717/124; 717/125; 717/127

(58) Field of Classification Search
USPC .................................. 717/124–138, 140–141
See application file for complete search history.

(56) References Cited

U.S. PATENT DOCUMENTS

| | | | |
|---|---|---|---|
| 5,317,740 A * | 5/1994 | Sites | 717/129 |
| 5,475,843 A * | 12/1995 | Halviatti et al. | 717/124 |
| 6,704,923 B1 * | 3/2004 | Gosling | 717/126 |
| 6,721,941 B1 * | 4/2004 | Morshed et al. | 717/127 |
| 6,832,369 B1 * | 12/2004 | Kryka et al. | 717/140 |
| 7,082,599 B1 * | 7/2006 | Morganelli et al. | 717/132 |
| 7,240,335 B2 * | 7/2007 | Angel et al. | 717/130 |
| 7,287,243 B2 * | 10/2007 | Dollin et al. | 717/126 |
| 7,805,708 B2 * | 9/2010 | Jeremiassen | 717/128 |
| 7,844,951 B2 * | 11/2010 | Chen et al. | 717/124 |
| 8,122,436 B2 * | 2/2012 | Costa et al. | 717/128 |
| 8,209,667 B2 * | 6/2012 | Eisner et al. | 717/126 |
| 8,291,386 B2 * | 10/2012 | Daniel | 717/125 |
| 8,302,080 B2 * | 10/2012 | Wassermann et al. | 717/131 |

FOREIGN PATENT DOCUMENTS

| | | |
|---|---|---|
| WO | 2009/033023 A2 | 3/2009 |
| WO | WO 2009/033023 A2 | 3/2009 |

OTHER PUBLICATIONS

Majumdar et al, "Hybrid concolic testing", IEEE, pp. 1-10, 2007.*
Davies et al, "High performance linpack benchmark: a fault tolerant implementation without checkpointing", ACM ICS, pp. 162-171, 2011.*
Moodly et al, "Design, modeling and evaluation of a scalable multi level checkpointing system", IEEE, pp. 1-11, 2010.*

(Continued)

*Primary Examiner* — Anil Khatri
(74) *Attorney, Agent, or Firm* — Blakely, Sokoloff, Taylor & Zafman LLP

(57) ABSTRACT

A method and apparatus is disclosed herein for automated testing of an application. A processing system executes the application using test input values that are generated for testing the application with respect to a property of interest. During execution, constraints among symbolic variables of the application are collected. Property state is collected and is used to determine whether a branch in the application is relevant to the property. Based on the collected constraints and branch relevancy, new test input values are generated. The process is repeated until all paths in the application corresponding to relevant branches have been explored.

19 Claims, 11 Drawing Sheets

OTHER PUBLICATIONS

Dong et al, "Hybrid checkpointing using emerging nonvolatile memories for future exascale systems", ACM Trans. on Arch. & Code Optim. vol. 8, No. 2, article 6, pp. 1-29, 2011.*

Agrawal, Hiralal, Et Al., "Dynamic Program Slicing", ACM SIGPLAN '90 Conference on Programming Language Design and Implementation, Jun. 1990, 11 pgs., White Plains, New York, USA.

Ball, Thomas, Et Al., "SLAM and Static Driver Verifier: Technology Transfer of Formal Methods inside Microsoft", Technical Report MSR-TR-2004-08, Jan. 28, 2004, 22 pgs., Microsoft Research, Microsoft Corporation, Redmond, WA, USA.

Beckman, Nels E., Et Al., "Proof From Tests", ISSTA ' 08, Jul. 2008, 11 pgs., Seattle, WA, USA.

Bird, D.L., Et Al., "Automatic generation of random self-checking test cases", IBM Systems Journal, 1983, 17 pgs., vol. 22, No. 3.

Cadar, Cristian, Et Al., "EXE: Automatically Generating Inputs of Death", CCS '06, Nov. 2006, 14 pgs., Alexandria, VA, USA.

Das, Manuvir, Et Al., "ESP: Path-Sensitive Program Verification in Polynomial Time", PLDI '02, Jun. 2002, 12 pgs., Berlin, Germany.

Fink, George, Et Al., "Property-Based Testing; A New Approach to Testing for Assurance", ACM Sigsoft, Software Engineering Notes, Jul. 1997, 7 pgs., vol. 22, No. 4.

Forrester, Justin E., Et Al., "An Empirical Study of the Robustness of Windows NT Applications Using Random Testing", 4th UNISEX Windows Symposium, Jul. 27, 2000, 10 pgs.

Godefroid, Patrice, "Compositional Dynamic Test Generation", POPL '07, Jan. 2007, 8 pgs., Nice, France.

Godefroid, Patrice, Et Al., "DART: Directed Automated Random Testing", PLDI '05, Jun. 2005, 11pgs., Chicago, IL, USA.

Hallem, Seth, Et Al., "A System and Language for Building SystemSpecific, Static Analyses", PLDI '02, Jun. 2002, 14 pgs., Berlin, Germany.

King, James C., Et Al., "Symbolic Execution and Program Testing", Communications of ACM, Jul. 1976, 10 pgs., vol. 19, No. 7.

Majumdar, Rupak, Et Al., "Hybrid Concolic Testing", IEEE 29$^{th}$ International Conference on Software Engineering, 2007, 10 pgs.

Wieser, Mark Et Al., "Program Slicing", IEEE 1981, 11 pgs.

PCT International Search Report for corresponding PCT Patent Application No. PCT/US2010/027139, 5 pgs.

PCT Written Opinion of the International Searching Authority for corresponding PCT Patent Application No. PCT/US2010/027139, 6 pgs.

Sen, et al., "CUTE and jCUTE: Concolic Unit Testing and Explicit Path Model-Checking Tools", Computer Aided Verification Lecture Notes in Computer Science, Jan. 1, 2006, pp. 419-423, Berlin, Germany.

PCT International Preliminary Report on Patentability for corresponding PCT Patent Application No. PCT/US2010/027139, 6 pgs.

Majumdar, et al., "Hybrid Concolic Testing", 29th IEEE International Conference on Software Engineering, May 1, 2007, pp. 416-426.

Henzinger, T., et al., "Software Verification with Blast," Proceedings of the Tenth International Workshop on Model Checking of Software (SPIN), Lecture Notes in Computer Science 2648, Springer-Verlag, 2003, 4 pgs.

Cadar, Christian, et al., "Klee: Unassisted and Automatic Generation of High-Coverage Tests for Complex Systems Programs," In Proceedings of the 8th USENIX conference on Operating systems design and implementation (2008), 14 pgs.

Boonstoppel, Peter, et al., "RWset: Attacking Path Explosion in Constraint-Based Test Generation," N TACAS'08: International Conference on Tools and Algorithms for the Constructions and Analysis of Systems, 2008, 16 pgs.

Burnim, Jacob, et al., "Heuristics for Scalable Dynamic Test Generation," Automated Software Engineering, 2008, 23rd IEEE/ACM International Conference, 4 pgs. n.

Sen, Koushik, et al., "Cute: A Concolic Unit Testing Engine for C," Proceedings of the 10$^{th}$ European Software Engineering Conference, Sep. 2005, 65 pgs.

* cited by examiner

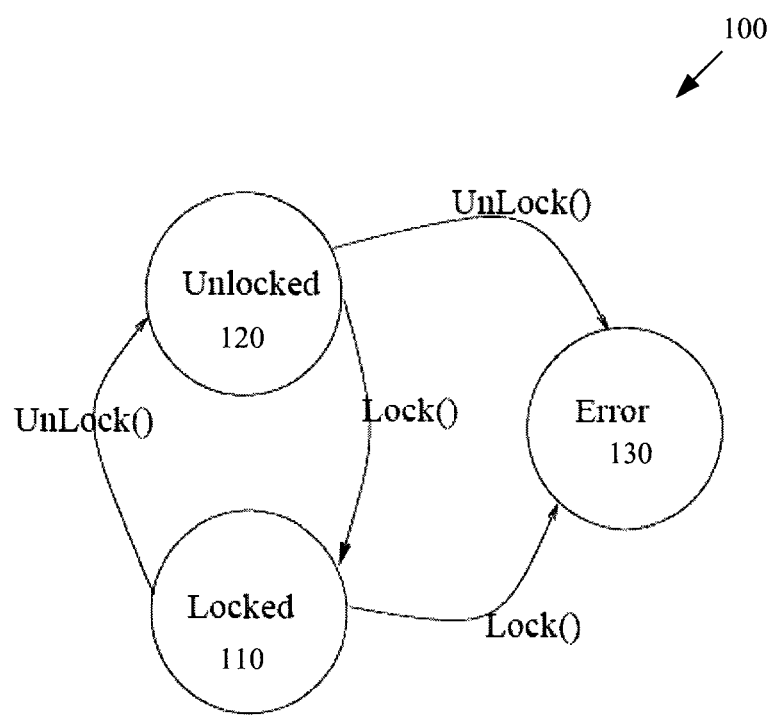
Figure 1: Locking property

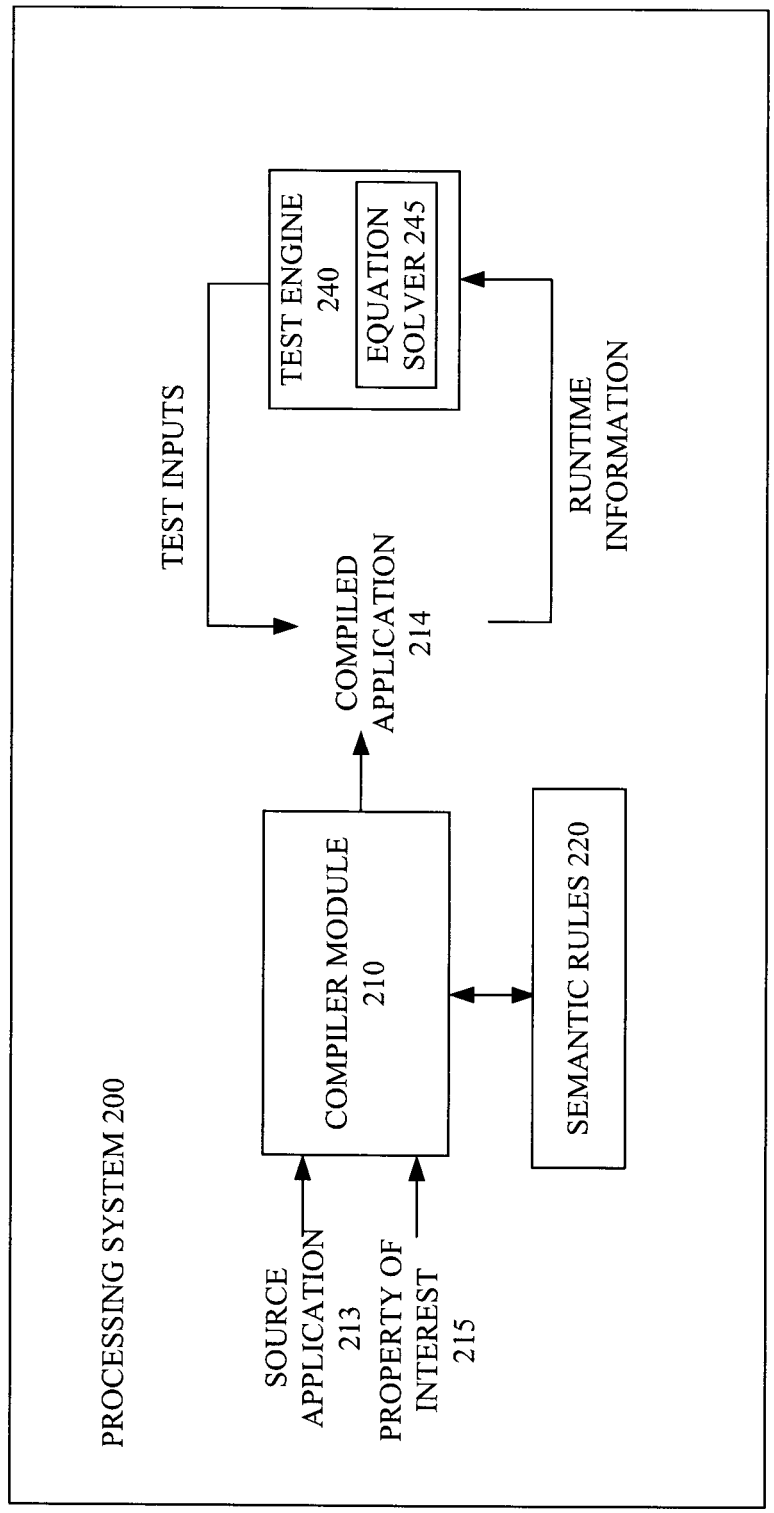
Figure 2 Processing System

```
function f {
L1: if (q) {
    lock;
    q = true;
  }

L2: if (p != 20)
    then_func1();
  else
    else_func1();

L3:  if (r == 100)
    then_func2();
  else
    else_func2()

L4:  if (q) {
    unlock;
    q = false;
  }
}
```

Figure 3  Running Example

```
for (int i = 0; i < 100; ++i) {
   CREST_int(x); //denote x as input
   if (x == 40345) {
      do_some_thing;
   }
}
```

400

Figure 4  Loop Example

```
if (p) {
   ... //doesnt change state or value of p
} else {
   ... //doesnt change state or value of p
} if (r) {
   p = 3 //forgets to update the state
} else {
   ... //doesnt change state or value of p
} if (p) {
   ... //doesnt change state or value of p
} else {
   state_change_error();
}
```

500

Figure 5  An Example Showing a Limitation

| | | |
|---|---|---|
| Int n m i j | | |
| Vars Var | | x y ... |
| SymVars SVar | | $\alpha_m \alpha_k$ |
| Expressions E | ::= | E op E |
| | | \| Var |
| | | \| n |
| Label l | | |
| Statements S | ::= | abort |
| | | — x := input() |
| | | — x := E |
| | | — l: if (E) then S else S |
| | | — S ; S |
| | | — stateChange(m) |
| | | — popS |
| VarEnv VEnv | ::= | VEnv[Var ⟶ n] |
| | | \| φ |
| InputList IL | ::= | n ; IL |
| | | \| φ |
| Terms for Concolic Semantics | | |
| SymExp | SymExp | ... (omitted, ) |
| SymVarEnv SEnv | ::= | SEnv[Var ⟶ SymExp] |
| | | \| φ |
| Branch b | ::= | 0 \| 1 |
| Coverage d | ::= | nc \| c |
| PathConstraints ζ | ::= | true \| ζ <Label, SymExp>. |
| CoverageStack CS | ::= | CS CS \| <Label, < Branch, Coverage>> \| pos |
| Terms for Property Testing Semantics | | |
| State P | ::= | n |
| PropStack PS | ::= | φ \| m ; PS |
| NonRelevantBranches NRB | ::= | φ \| NRB < (Label, Branch), State > |
| BranchPropStateMap BPM | ::= | φ \| BPM < (Label, Branch), State > |

Figure 7  Abstract Syntax for Core Language

R1 $\dfrac{(VEnv, SEnv, \zeta, CS, IL, S1) \longrightarrow_{stmt} (VEnv', SEnv', \zeta', CS', IL', \epsilon)}{(VEnv, SEnv, \zeta, CS, IL, S1 ; S2) \longrightarrow_{stmt} (VEnv', SEnv', \zeta', CS', IL', S2)}$ R2 $(VEnv, SEnv, \zeta, CS, IL, x = E) \longrightarrow_{stmt} (VEnv \, [\, x \leftarrow eval\_concrete(VEnv, E)],$
$SEnv \, [x \leftarrow eval\_symbolic(SEnv, VEnv, E)], \zeta, CS, IL, \epsilon)$ R3 $(VEnv, SEnv, \zeta, CS, (m ; IL), x = input()) \longrightarrow_{stmt} (VEnv[x \leftarrow m], SEnv \, [\, x \leftarrow \alpha_k], \zeta, CS,$
$IL, \epsilon)$ where $\alpha_k \notin Range(SEnv)$ R3' $(VEnv, SEnv, \zeta, CS, (\,), x = input()) \longrightarrow_{stmt} (VEnv[x \leftarrow m], SEnv \, [\, x \leftarrow \alpha_k], \zeta, CS, IL, \epsilon)$
where $\alpha_k \notin Range(SEnv)$ and m is random.

R4 $(VEnv, SEnv, \zeta, CS \ pos <l, <1, nc> >, IL, l: \ if \ E \ then \ S \ else \ S') \longrightarrow_{stmt} (VEnv, SEnv, \zeta$
$<l, neg(eval\_symbolic(SEnv, VEnv, E))>, CS <l, <0, c > pos,IL, S')$ if $eval\_concrete(VEnv,$
$E) = 0$ R4* $(VEnv, SEnv, \zeta, CS \ pos <l, <0, d> > CS', IL, l: \ if \ E \ then \ S \ else \ S') \longrightarrow_{stmt} (VEnv,$
$SEnv, \zeta <l, neg(eval\_symbolic(SEnv, VEnv, E))>, CS <l, <0, d > > pos \ CS',IL, S')$ if
$eval\_concrete(VEnv, E) = 0$ R4" $(VEnv, SEnv, \zeta, CS \ pos, IL, l: \ if \ E \ then \ S \ else \ S') \longrightarrow_{stmt} (VEnv, SEnv, \zeta <l,$
$neg(eval\_symbolic(SEnv, VEnv, E))>, CS <l, <0, nc > > pos,IL, S')$ if $eval\_concrete(VEnv,$
$E) = 0$ R5 $(VEnv, SEnv, \zeta, CS \ pos <1, <0, nc> >, IL, l: \ if \ E \ then \ S \ else \ S') \longrightarrow_{stmt} (VEnv, SEnv,$
$\zeta <l, eval\_symbolic(SEnv, VEnv, E)>, CS <l, <1, c> > pos , IL, S)$ if $eval\_concrete(VEnv,$
$E) \neq 0$ R5' $(VEnv, SEnv, \zeta, CS \ pos < 1, <1, d> > CS' \ end, IL, l: \ if \ E \ then \ S \ else \ S') \longrightarrow_{stmt} (VEnv,$
$SEnv, \zeta <l , eval\_symbolic(SEnv, VEnv, E) >, CS <l, <1, d> > pos \ CS' \ end , IL, S)$ if
$eval\_concrete(VEnv, E) \neq 0$ R5" $(VEnv, SEnv, \zeta, CS \ pos, IL, l: \ if \ E \ then \ S \ else \ S') \longrightarrow_{stmt} (VEnv, SEnv, \zeta <l ,$
$eval\_symbolic(SEnv, VEnv, E)>, CS <l, <1, nc> > pos , IL, S)$ if $eval\_concrete(VEnv,$
$E) \neq 0$ R6 $(VEnv, SEnv, \zeta, CS, IL, abort) \longrightarrow_{stmt} Error$

Figure 8 Concolic Execution Semantics

```
                                                                    900
solve_path_constraints(CS, ζ) {                                    ↙
    find 1. the top most branch in CS, such that it is not covered
    i.e. CS = CS1 <l, <b, nc> > CS2 s.t. for all < l', <b , d> > ∈ CS2, d == c.
    if l does not exist then return (1,_,_) ; //we are done
    let (ζ₁ < l , SE > ζ₂) = ζ
    if path constraints ζ₁ < l, SE > has a solution IL'
        return (0, update(IL, IL'), CS1 <l, < b, nc> >)
    else
        return solve_path_constraints(CS1, ζ₁)
}
                                                                    910
ConcolicTesting(S) {                                               ↙
    IL := empty; //empty input list
    CS := ε; //empty coverage stack
    while (1)
        try (ζ, CS') = eval_concolic(S, IL, CS)
          (done, IL, CS) = solve_path_constraint(CS', ζ)
          if (done) return;
        catch abortException
        print "bug found"
        return;
}
```

Figure 9  Concolic Testing Algorithm

R1 $\dfrac{(\text{VEnv, SEnv}, \zeta, \text{CS, PS, BPM, NRB, P, IL, S1}) \longrightarrow_{stmt} (\text{VEnv', SEnv'}, \zeta', \text{CS', PS', BPM', NRB', P, IL'}, \epsilon)}{(\text{VEnv, SEnv}, \zeta, \text{CS, PS, BPM, NRB, P, IL, S1 ; S2}) \longrightarrow_{stmt} (\text{VEnv', SEnv'}, \zeta', \text{CS', PS', BPM', NRB', P, IL', S2})}$ R2 (VEnv, SEnv, $\zeta$, CS, PS, BPM, NRB, P, IL, x = E) $\longrightarrow_{stmt}$
    (VEnv [ x ← eval_concrete(VEnv, E)], SEnv [x ← eval_symbolic(SEnv, VEnv, E)],
    $\zeta$, CS, PS, BPM, NRB, P, IL, $\epsilon$)

R3 (VEnv, SEnv, $\zeta$, CS, PS, BPM, NRB, P, ( m ; IL), x = input()) $\longrightarrow_{stmt}$ (VEnv[x ← m], SEnv
    [ x ← $\alpha_k$], $\zeta$, CS, PS, BPM, NRB, P, IL, $\epsilon$) where $\alpha_k \notin$ Range(SEnv)

R3' (VEnv, SEnv, $\zeta$, CS, PS, BPM, NRB, P, $\phi$, x = input()) $\longrightarrow_{stmt}$ (VEnv[x ← m], SEnv [ x
    ← $\alpha_k$], $\zeta$, CS, PS, BPM, NRB, P, IL, $\epsilon$) where $\alpha_k \notin$ Range(SEnv) and m is random.

R4 (VEnv, SEnv, $\zeta$, CS <l, < 1 , 0 >>, PS , BPM , NRB, P, IL, l: if E then S else S') $\longrightarrow_{stmt}$
    (VEnv, SEnv, $\zeta$ <l, neg(eval_symbolic(SEnv, VEnv, E))>, CS <l, <0, 1 > , (PS ; P) , BPM [
    (l,0) ← P], NRB, P, IL, S' ; popS(l,0)) if eval_concrete(VEnv, E) = 0

R4' (VEnv, SEnv, $\zeta$, CS <l, < 0 , d >> CS', PS, BPM, NRB, P, IL, l: if E then S else S') $\longrightarrow_{stmt}$
    (VEnv, SEnv, $\zeta$ <l, neg(eval_symbolic(SEnv, VEnv, E))>, CS <l, <0, d >> CS', (PS ; P),
    BPM [ (l,0) ← P], NRB, P, IL, S'; popS(l,0)) if eval_concrete(VEnv, E) = 0

R4" (VEnv, SEnv, $\zeta$, CS <l, < 1 , d >> CS', PS, BPM, NRB, P, IL, l: if E then S else S') $\longrightarrow_{stmt}$
    (VEnv, SEnv, $\zeta$ <l, neg(eval_symbolic(SEnv, VEnv, E))>, CS <l, <0, 1 >>, (PS ; P), BPM
    [(l,0) ← P], NRB, P, IL, S'; popS(l,0)) if eval_concrete(VEnv, E) = 0

R5 (VEnv, SEnv, $\zeta$, CS < 1 , < 0, nc> >, PS, BPM, NRB, P, IL, l: if E then S else S') $\longrightarrow_{stmt}$
    (VEnv, SEnv, $\zeta$ <1 , eval_symbolic(SEnv, VEnv, E)>, CS <l, <1, c> > , (PS ; P), BPM
    [(l,1) ← P], NRB, P, IL, S ; popS(l,1)) if eval_concrete(VEnv, E) $\neq$ 0

R5' (VEnv, SEnv, $\zeta$, CS < 1 , < 1, d> > CS', PS, BPM, NRB, P, IL, l: if E then S else S')
    $\longrightarrow_{stmt}$ (VEnv, SEnv, $\zeta$ <1 , neg((eval_symbolic(SEnv, VEnv, E))>, CS <l, <1, d> > CS',
    (PS ; P), BPM [(l,1) ← P], NRB, P, IL, S; popS(l,1)) if eval_concrete(VEnv, E) $\neq$ 0

R5" (VEnv, SEnv, $\zeta$, CS < 1 , < 0, d> > CS', PS, BPM, NRB, P, IL, l: if E then S else S')
    $\longrightarrow_{stmt}$ (VEnv, SEnv, $\zeta$ <1 , neg((eval_symbolic(SEnv, VEnv, E))>, CS <l, <1, c> > , (PS
    ; P), BPM [(l,1) ← P], NRB, P, IL, S; popS(l,1)) if eval_concrete(VEnv, E) $\neq$ 0

R6 (VEnv, SEnv, $\zeta$, CS, PS, BPM, NRB, P, IL, abort) $\longrightarrow_{stmt}$ Error R7 (VEnv, SEnv, $\zeta$, CS, (PS ; P'), BPM, NRB, P, IL, popS(l,b)) $\longrightarrow_{stmt}$ (VEnv, SEnv, $\zeta$, CS,
    PS, BPM, NRB [ (l, b) ← P] , P, IL, $\epsilon$) if (P = P')

R7' (VEnv, SEnv, $\zeta$, CS, (PS ; P'), BPM, NRB, P, IL, popS(l,b)) $\longrightarrow_{stmt}$ (VEnv, SEnv, $\zeta$, CS,
    PS, BPM, NRB , P, IL, $\epsilon$) if (P $\neq$ P')

R8 (VEnv, SEnv, $\zeta$, CS, PS, BPM, NRB, P, IL, stateChange(m)) $\longrightarrow_{stmt}$ (VEnv, SEnv, $\zeta$, CS,
    PS, BPM, NRB , m, IL, $\epsilon$)

Figure 10  Property Testing Semantics

```
solve_path_constraints(CS, ζ, BPM, NRB) {                    1100
    find l, the top most branch in CS such that it is not covered and both the branch and its the
negation are relevant.
    i.e. CS = CS1 <l, <b, nc> > CS2 s.t. for all < l', <b , d> > ∈ CS2, d == c and if <(l ,not(b)),
BPM(l,b) > ∉ NRB and <(l ,b), BPM(l,b) > ∉ NRB
    if l does not exist then return (1,_,_) ; //we are done let (ζ₁ < l , SE > ζ₂) = ζ
    if path constraints ζ₁ < l, SE > has a solution IL'
        return (0, update(IL, IL'), CS1 <l, < b, nc>> )
    else
        return solve_path_constraints(CS1, ζ₁)
}
                                                              1120
PropertyTesting(S) {
    IL := empty; //empty input list
    CS := ε; //empty coverage stack
    NRB := ε; //initially every branch is relevant
    while (1)
        try (ζ, CS' , BPM, NRB) = property_test_semantics(S, IL, CS)
            (done, IL, CS) = solve_path_constraint(CS', ζ, BPM, NRB)
            if (done) return;
        catch abortException
            print "bug found"
            return;
}
```

Figure 11 Property Testing Algorithm

DIRECTED TESTING FOR PROPERTY VIOLATIONS

RELATED APPLICATION

The present patent application claims priority to and incorporates by reference the corresponding provisional patent application Ser. No. 61/160,464, titled, "Directed Testing for Property Violations", filed on Mar. 16, 2009.

FIELD OF THE INVENTION

The present invention relates to the field of testing computer programs; more particularly, the present invention relates to automatically generating test cases that can detect property violations in computer programs.

BACKGROUND OF THE INVENTION

Much of the resources for software development in industry are spent on testing and validating software. Industry adoption of automated validation techniques and/or automated test generation techniques has been limited to only some special software domains like automotive/control software. The main technical reason for this limited use of automated techniques is that of scalability. For instance, for moderately large code bases, some automated test generation techniques tend to generate millions of test cases, making them impractical. The predominant way that industry tests software currently is by manually generating test cases and then carrying out the tests. Manual testing, on the other hand, being resource intensive and incomplete, does not scale for increasingly complex modern software.

One approach to software testing is automatic test generation. There are several bodies of research on using automated testing techniques both to improve coverage and reduce cost. The automatic test generation can be classified into three different types: random testing, symbolic test generation and directed testing. Each of these types is discussed below.

A more successful industry use of automatic test generation techniques might be the use of random testing. However, the limitations of random testing are well known. For example, some branches of the program (e.g. if (x==42) . . . where x is an input) have a very little chance of being executed using traditional randomly generated inputs.

One of the first automatic test generation techniques proposed is to symbolically execute the program and solve the symbolic constraints on each path for each potential error inducing statement. Since then, there have been several improvements proposed including a recent state of the art technique called KLEE. KLEE improves traditional symbolic test generation techniques in many ways including modeling the environment to figure out the errors due to environment, using a powerful constraint solver, and parallel processing to efficiently solve many constraints. KLEE has shown that it is indeed possible to scale symbolic execution to thousands of lines of code. In the case of property testing, however, KLEE is still a brute force solution trying to look for problems in all the areas of the code.

Directed testing techniques use random testing to avoid intractability and use symbolic analysis to improve coverage. An example of an existing directed testing technique is Concolic Unit Testing Engine (CUTE). "Concolic" is a portmanteau of concrete and symbolic. Concolic testing, such as CUTE, is a hybrid software verification technique that interleaves concrete execution (testing on particular inputs) with symbolic execution, a classical technique that treats program variables as symbolic variables. Symbolic execution is used in conjunction with an automated theorem proven to generate new concrete inputs (test cases) with the aim of maximizing code coverage. Its main focus is finding bugs in real-world software, rather than demonstrating program correctness. CUTE starts off by randomly generating inputs as in the case with pure random testing. While executing the program on the random input, CUTE also collects symbolic constraints on the program statements and branches along the current execution path. After finishing the execution, CUTE generates new inputs for subsequent execution by analyzing the constraints collected in the previous executions. New inputs are generated by iteratively negating the symbolic constraints collected on the branches of the previous iteration and then solving them. If a solution exists, then the new inputs are certain to drive the program on the alternative paths, thus increasing coverage. In cases where it is hard to solve the constraints (e.g. due to limitations of the constraint solver) or no symbolic constraints exist because of external functions, CUTE falls back on using the concrete values of the previous iteration. While directed techniques like CUTE solve the practical problems of external calls (at the expense of some fault detection capability), they still suffer from the problem of path explosion. For example, a branch inside a loop which is executed N times for one input, could potentially generate $2^N$ new inputs.

Another approach, referred to as "property checking," is based on partial program verification and/or static analysis techniques. Recent research that adopts this approach has focused on partial verification or validation of software. These techniques check whether the software obeys certain properties of interest. The properties are typically expressed as type state properties. Some of these techniques have shown to scale to hundreds of thousands of lines of code. However, the biggest limitation of these techniques is the large number of false positives they report. This is mainly due to limitations on the analysis capability of static techniques in the presence of heap data structures and calls to external libraries.

Property-based testing describes a method for property testing that first slices the program with respect to the property of interest. It then performs unit testing with respect to the reduced program. The main problem with the conventional property-based approach is the reliance on static slicing algorithms. It is known that static slicing algorithms do not work well in the presence of aliasing and heap data structures.

SUMMARY OF THE INVENTION

A method and apparatus are disclosed herein for automated testing of an application. A processing system executes the application using test input values that are generated for testing the application with respect to a property of interest. During execution, constraints among symbolic variables of the application are collected. Property state is collected and is used to determine whether a branch in the application is relevant to the property. Based on the collected constraints and branch relevancy, new test input values are generated. The test is repeated until all of the branches in the application are covered.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 illustrates an example of a locking property.

FIG. 2 illustrates a processing system in which embodiments of the present invention may operation.

FIG. 3 illustrates an example of a code segment on which embodiments of the present invention may apply.

FIG. 4 illustrates an example of a loop.

FIG. 5 illustrates an example showing a limitation on fault detection.

FIG. 7 illustrates an example of an abstract syntax for a core language.

FIG. 8 illustrates an example of concolic execution semantics.

FIG. 9 illustrates an example of a concolic testing algorithm.

FIG. 10 illustrates an example of property testing semantics.

FIG. 11 illustrates an example of a property testing algorithm.

DETAILED DESCRIPTION OF THE PRESENT INVENTION

Figure 6:
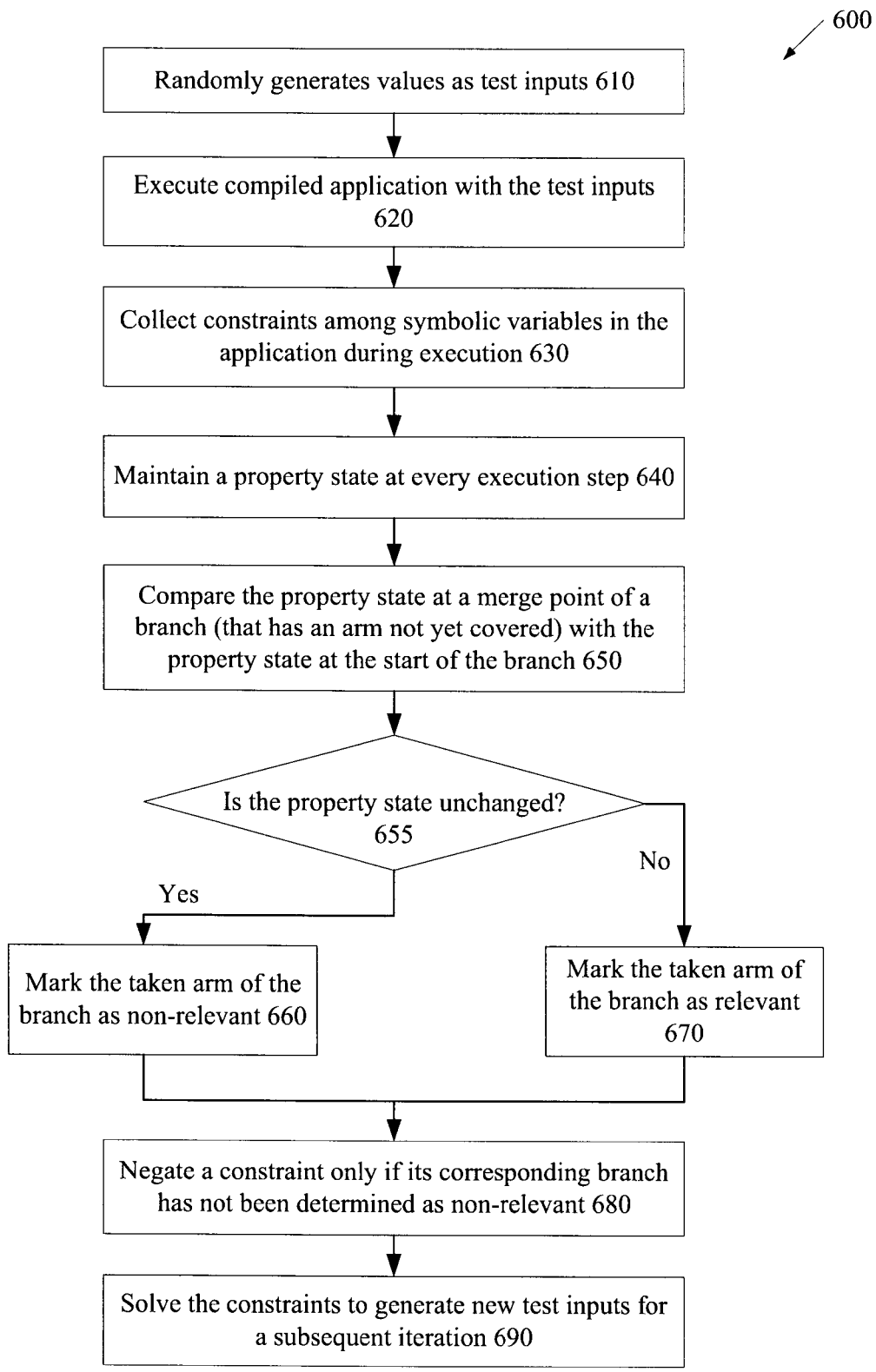
FIG. 6 is a flow diagram illustrating an embodiment of a property testing technique.

A new approach to software testing is described herein. The approach adapts directed testing to generate tests that expose violations of specific properties that a code base is expected to obey. A heuristic is used to prune exploration of paths that are typically not relevant to the property of interest. This focused exploration of the program paths can generate test inputs that detect property violations much more effectively than previous directed testing techniques.

In the following description, the new approach is referred to as the property testing technique or property testing algorithm. The properties under test can be used in partial verification of software, such as type state properties. The property testing technique solves the problem of path explosion in directed testing by using a new heuristic that focuses on testing for property violations. The property testing technique is distinct from the conventional property-based approach in that the new approach does not rely on static slicing algorithms. Instead, the property testing technique described herein uses a new heuristic that is based on dynamic runtime information to prune possible execution paths, thus side stepping the problem with pure static analysis based approach.

FIG. 1 illustrates an example of a property, namely locking property 100. The locking property 100 is described by a lock state 110, an unlock state 120 and an error state 130. State transitions can be achieved by calls to lock( ) and unlock( ). The locking property 100 may be violated in a number of scenarios, e.g., when a test input causes two consecutive calls to lock( ) without an unlock( ) between them. In one embodiment, the property testing technique uses directed testing to identify test inputs which lead to violation of a property, e.g., test inputs that lead the property state to the error state 130. During execution (e.g., at runtime), the property testing technique detects branches in an application (also referred to as a program or code) that do not influence the property of interest (e.g., the locking property 100, a set timer property, or any other properties of interest to a program developer or a user). These branches are referred to as "non-relevant branches." As a non-relevant branch does not influence the property of interest, it is often not necessary to repeatedly explore both arms of the branch during testing for property violations. The property testing technique detects non-relevant branches and explores just one arm of such branches, thus drastically eliminating the cost of exponential path exploration. The property testing technique dramatically reduces the number of inputs that need to be explored to detect violations for some properties of interest.

Embodiments of the present invention provide a scalable automatic test generation technique that focuses on detecting important classes of errors. Given limited testing resources, the property testing technique focuses on critical errors, such as errors that may encountered by a user during runtime. For example, the property testing technique may detect a runtime exception when a user attempts to add a contact to this address book. By focusing the test generation on critical errors, the demand on testing time and other resources may be greatly reduced.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "executing" or "collecting" or "determining" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

FIG. 2 is a block diagram that illustrates an embodiment of a processing system 200 in which embodiments of the present invention may operate. The processing system 200 includes a compiler module 210, which receives a source application 213 and a property of interest 215, and compiles a source application 213 into a compiled application 214. For example, the source application 213 may be a program in the C programming language, and the compiled application 214 may be the corresponding object code. The compiler module 210 consults a rule module 220 for compiling the source application 213. The rule module 220 includes a collection of semantic rules for property testing (which will be described in greater detail with reference to FIG. 10). According to the semantic rules, the compiler module 210 inserts code into the compiled application 214, such that during runtime, the compiled application 214 generates information necessary for property testing and collects the information in a data structure (e.g., stacks). Therefore, the compiled application 214 is also referred to as instrumented code; that is, code instrumented with the semantic rules. In one embodiment, the information includes a set of non-relevant branches with respect to a property of interest, as well as path constraints imposed by the symbolic variables of the compiled application 214. The processing system 200 further includes a test engine 240, which generates test inputs for the compiled application 214 based on the output from a previous iteration of the compiled application 214. The test engine 240 may include an equation solver 245 that solves the path constraints generated from the previous iteration. The test engine 240 repeatedly generates test inputs until all paths corresponding to relevant branches in the application 214 have been explored and no new path constraints are generated.

In an alternative embodiment, the complier module 210 and the test engine 240 may reside in different processing systems. The compiler module 210 and the test engine 240 may be implemented by software, hardware, or a combination of both. The processing system 100 may be a server, a workstation, a personal computer (PC), a mobile phone, a palm-sized computing device, a personal digital assistant (PDA), etc.

The main idea of the property testing technique can be explained with a code segment 300 shown in FIG. 3. Referring to FIG. 3, the code segment 300 is to be tested with respect to the locking property 100 of FIG. 1. It is assumed that "then func1", "then func2", "else func1" and "else func2" do not have any property changing methods (i.e. do not contain any calls to lock( ) or unlock( ), and that p, q, r are identified inputs to the function.

In one embodiment, a processing system executes the code segment 300 both concretely on an input and also symbolically at the same time. The symbolic execution keeps track of symbolic memory and constraints on branches along the path of execution.

To illustrate the distinct features of the property testing technique, it is useful to understand how a generic concolic execution (such as CUTE) would be performed on the code segment 300. A generic concolic execution starts off by using randomly generated values for each of the inputs. Assume the initial random values for p, q, r are true, 15681, 20745, respectively. So, the code segment 300 executes the then branches at L1, L2, L4, and the else branch at L3. During execution, a symbolic path constraint is collected by the instrumented code, namely ($q_0$=true, $p_0$!=20, $r_0$!=100). To force the code segment 300 through a different branch in the next iteration, the processing system calculates a solution to the path constraint ($q_0$=true, $p_0$!=20, $r_0$=100) obtained by negating the last predicate of the current path constraint. The solution (illustratively, ($q_0$=true, $p_0$=345345, $r_0$=100)) is used as the input for the next run of the code segment 300. A generic concolic technique (such as CUTE) will repeat the above operations until all paths have been explored. The CUTE approach will explore paths corresponding to all combinations of the branches at L1, L2, L3 being true or false (8 paths in total) before concluding that the program does not have any errors with respect to the property of interest.

Embodiments of the present invention take note that only the value of q in FIG. 3 affects the state of the program with respect to the property of interest, while values of p and r do not. A processing system (e.g., the processing system 200 of FIG. 2) detects this behavior and exploits it by restricting subsequent iterations to just one arm of the branches at both L2 and L3. The processing system does this by also recording property states in addition to the symbolic constraints at each program point (e.g., at a branch point and a merge point of a branch). At every merge point of a branch (where the two arms of the branch join), the processing system checks if either arms of the branch (if they have been executed already) affect the property of interest. If both of the arms do not change the property of interest, then the branch is marked as a non-relevant branch.

Referring to the example of FIG. 3, in the first iteration, the processing system according to one embodiment of the present invention uses random input values for p, q, r. During execution of the instrumented code, the processing system also keeps track of the property state along with the symbolic state and constraints. The path constraint ($q_0$=true, $p_0$!=20, $r_0$!=100) is recorded along with a property state map L1→uninit, L2→Locked, L3→Locked, L4→Locked. It then proceeds to negate the last predicate of the path constraint and solves the constraints to obtain a new input (illustratively, ($q_0$=true, $p_0$=345709, $r_0$=100), for the second iteration. After the second iteration, the processing system using a property testing heuristic to take note that both arms of the branch at L3 have been explored, the initial state at L3 and the state at the merge point L4 for both the branches is the same Locked. It then marks the branch at L3 when reached with state Locked as non relevant (that is, the path constraint for the branch needs not be negated in future iterations). In the third iteration, the solution for path constraint ($q_0$=true, $p_0$=20) is explored (illustratively, ($q_0$=true, $p_0$=20, $r_0$=19746)). At the end of the third iteration, the path constraint is ($q_0$=true, $p_0$=20, $r_0$!=100). This is where the property testing technique diverges from other existing concolic approaches (such as CUTE). Here, a processing system implementing the property testing technique takes note that the property state at L3 is Locked in the third iteration, and determines that negating the predicate at L3 is not necessary since the branch is unaffecting when the property state is Locked. The processing system then proceeds to directly explore the solution of path constraint obtained by negating ($q_0$=true) in the fourth iteration. Consequently, for the example above, the property testing technique checks only these six paths: (L1-then, L2-then, L3-else) (L1-then, L2-then, L3-then) (L1-then, L2-else, L3-else) (L1-else, L2-then, L3-else) (L1-else, L2-then, L3-then) (L1-else, L2-else, L3-else). As the number of non-relevant branches increases, the property testing technique achieves a greater benefit when compared to the CUTE approach.

Loop Handling

FIG. 4 illustrates a loop example in which embodiments of the present invention have an order of magnitude benefit over the CUTE approach, especially for branches inside of loops, while still retaining much of the ability to quickly detect common property violations.

One of the main constructs in C programs that results in exponential behavior in the CUTE algorithm is loops. Thus, the property testing technique in comparison to CUTE when dealing with loops deserves special mention. If a loop executes n iterations in a run and contains k branches, there will be n*k branches that can possibly be flipped in the subsequent iterations. In the worst case, $2^{n*k}$ number of inputs will need to be generated in the subsequent iterations to completely cover all the possibilities. Due to this exponential nature of the CUTE algorithm, any sufficiently large loop iteration can quickly make the problem intractable. This is illustrated in a code segment 400 shown in FIG. 4. Referring to FIG. 4, in each iteration of the loop, there is a branch point resulting in 100 branches in the unrolled initial run of the program. In order to fully explore all these branches, CUTE generates $2^{100}$ different values for x. Depending on the implementation, CUTE may never proceed to analyze the branches either before the loop or after them.

In particular, if do_some_thing does not affect the property state, then the entire loop does not affect the property state and may never need to be explored to detect property violations.

In one embodiment, the property testing technique provides a solution to loop handling by computing branch relevancy based on the branch label. For all of the 100 branches, the branch label is the same in every iteration of the loop. So once it is detected that the branch in the loop does not affect the property state (e.g., within two input sequences), the branch is never flipped again (that is, it will not be necessary to explore the alternative arm of the branch), thus covering the entire loop within two iterations. Therefore, the property testing technique n is much more efficient than existing concolic testing. As paths are efficiently pruned, the property testing technique can get to the critical portions (e.g., error-prone portions) of the program quickly.

Fault Detection

FIG. 5 is a code segment 500 that illustrates a limitation of the property testing technique. Typically, programmers use guard variables to keep track of the property state within the program. In a scenario where a programmer incorrectly updates guard variables without any corresponding change in the property state, the property testing technique described herein may fail to detect some faults. Nevertheless, the property testing technique is able to detect a converse scenario in which a programmer updates the state but forgets to update the guard variable.

Referring to FIG. 5, assume that a non-zero value for p and r is chosen as the initial test input. In this case, the property testing technique will detect that r is not a relevant branch after two iterations since there is no state change operation. In the third iteration when p is chosen to be false, the property testing technique does not explore both the arms of the second branch since it deems that branch is irrelevant. Consequently, in one scenario, it may choose to only explore the branch in which r>0 and miss the error that occurs when p is false. This situation can be remedied by providing a rule that any changes to the guard variables count as a property state change either manually or automatically (e.g., by incorporating dynamic slicing or conservative static slicing).

Property Testing Method

FIG. 6 is a flow diagram illustrating one embodiment of a method 600 for the property testing technique described herein. The method 600 may be performed by processing logic that may comprise hardware (circuitry, dedicated logic, etc.), software (such as that run on a general purpose computer system or a dedicated machine), or a combination of both. In one embodiment, the method 600 may be performed by the processing system 200 of FIG. 2.

Referring to FIGS. 2 and 6, in one embodiment, the method 600 begins when the test engine 240 randomly generates values as test inputs to a compiled application (block 610). The processing system 200 executes the compiled application with the test inputs (block 620). During execution, the processing system 200 also executes the compiled application symbolically and collects constraints among the symbolic variables (block 630). Concurrently, the processing system 200 also maintains a property state at every execution step (block 640). In an alternative embodiment, the property state is recorded at the branch point (where the arms of the branch fork) and the merge point (where the arms of a branch join) of every branch. The property state is recorded in a data structure, such as a stack. During execution, the processing system 600 compares the property state at the merge point of a not-yet-covered branch with the property state at its branch point (block 650). The processing system 600 determines whether the property state is the same at these two points, that is, whether the property state is unchanged by the corresponding branch operation (block 655). If the property state at these two points of the branch is the same, the arm of the branch taken by the execution is marked as non-relevant (block 660). Otherwise, the arm of the branch taken by the execution is marked as relevant (block 670). A branch is non-relevant if both of its arms are marked non-relevant.

Continuing from blocks 660 and 670, in one embodiment, the processing system 200 negates a constraint (e.g., the last constraint in the execution) only if its corresponding branch has not been determined as non-relevant (block 680) That is, potentially non-relevant branches are executed at least once before recognizing they are non-relevant. Negating a constraint means that the predicate controlling the direction of the branch is given a value that forces the execution in the next iteration into the alternative arm of the branch. For example, if the "then" arm is taken in the current iteration, negating the constraint means imposing constraints on the program variables such that the "else" arm of the branch will be taken in the next iteration.

Based on the constraints collected at block 630 and the negated constraint produced at block 680 (only if its corresponding branch has not yet been determined as non-relevant), the test engine 240 solves the constraints to generate new test inputs for a subsequent iteration (block 690). In the subsequent iterations, property state for the not-yet-covered branches is compared to update branch relevancy. The processing system 200 repeats the operations at blocks 620-690 until all paths corresponding to relevant branches have been explored and no new path constraints are generated. In one embodiment, the processing system 200 maintains a data structure (e.g., a coverage stack) that keeps track of the branches covered by the iterations. Once the processing system 200 determines that all relevant branches of paths have been explored and no new path constraints are generated, the method 600 may terminate and generate no more test inputs.

Detailed Implementation

Before describing the detailed implementation of the property testing algorithm, it is useful to explain the syntax and semantics on which the algorithm is based. FIG. 7 illustrates an abstract syntax of a core language used by the property testing algorithm, according to one embodiment of the present invention. FIG. 8 illustrates the semantic rules used by a generic concolic testing algorithm (e.g., the CUTE algorithm) and FIG. 9 illustrates the concolic testing algorithm. FIG. 10 illustrates the semantic rules used by the property testing algorithm and FIG. 11 illustrates the property testing algorithm, according to one embodiment of the present invention.

Syntax

FIG. 7 illustrates an example of a simple imperative programming language (also referred to as the core language). A statement in this language is one of the following: (1) the abort statement signifying program error, (2) an input statement x:=input( ) that gets an external input into a variable x, (3) an assignment x:=E, and (4) a labeled conditional statement if(E) then S1 else S2, where E is an expression and S1, S2 are statements in the program.

In FIG. 7, VEnv, the variable environment, is a partial map between local variables and their values. IL is the list of inputs from which the program reads the inputs. The rest of the terms, including, stateChange, popS, SymVarEnv, PathConstraints, CoverageStack, State, PropStack, NonRelevantBranches, and Branch-PropStateMap are not part of the core language or the concrete semantics, but are necessary for describing the CUTE semantics and the semantics for property testing to be discussed later. The details of the term SymExp are omitted here. A description of SymExp can be found in J. C. King, "Symbolic execution and program testing," *Communications of the ACM,* 19(7):385-394, 1976.

Concrete Semantics for Expressions

A function eval_concrete implements the concrete semantics for evaluating expressions in a program. It takes as input a VarEnv (a mapping from variables to their values) and an expression to evaluate, and returns a value.

$$\text{eval\_concrete: VarEnv} \times \text{Expressions} \rightarrow \text{Value} \quad (1)$$

Symbolic Semantics for Expressions

In symbolic semantics, a mapping is maintained from variables to symbolic expressions along with a regular environment. This mapping is called a symbolic environment and is referred to as SymVarEnv. A function eval_symbolic implements the symbolic semantics for evaluating expressions in a program. The function takes as input a VarEnv, SymVarEnv and an expression, and returns a symbolic expression, SymExp.

$$\text{eval\_symbolic: VarEnv SymVarEnv Expressions} \rightarrow \text{SymExp} \quad (2)$$

Concrete values of the variables (available from the VarEnv) can be used to simplify SymExp by substituting concrete values for symbolic expressions. The substitution may be performed whenever the symbolic expressions go beyond the complexity that can be handled by symbolic decision procedures.

CUTE Semantics and Testing Algorithm

FIG. 8 illustrates the semantic rules for generic concolic execution of a program, such as CUTE. The semantic rules are discussed herein to illustrate the differences from the property testing semantics, to be described with reference to FIG. 10. Referring to FIG. 8, the symbolic constraint ζ maintains the current path constraint when executing the program. At every conditional statement 1: if(e) S1 else S2, if the concrete execution takes the then branch, the symbolic constraint ζ is updated to ζ <(1, eval_symbolic(VEnv, SEnv, e)> as shown in R5, R5'. If the execution takes the else branch, then the path constraint ζ is updated to ζ <1, neg(eval_symbolic(SEnv, VEnv,e))> as shown in R4 and R4'.

During the generic concolic execution, a processing system maintains a coverage stack CS which is primarily used for bookkeeping and used in a test generation algorithm (see FIG. 9). CS essentially maintains the coverage information from previous iterations of the testing algorithm useful for judging whether a branch has both its arms covered for a path prefix. <1, <0, c>> indicates that the else branch at 1 is covered and <1, <0, nc>> indicates that the else branch at 1 is not covered. Similarly, <1, <1, c>> indicates that the then branch at 1 is covered and <1, <1, nc>> indicates that the then branch at 1 is not covered. pos is a position marker on the coverage stack; (CS pos<1, b, d>CS1) indicates the next branch that might be executed will be at 1. pos at the top of the coverage stack (CS pos) indicates that there is no coverage information for branches from this point on, i.e. this is the first time these branches are being explored with this path prefix. In R4 and R5 the top of the coverage stack is uncovered and is updated to be covered. These uncovered branches on top of the coverage stack denote the branches where the testing algorithm in the previous iteration executed one arm of the branch and in this iteration has forced the execution to proceed along the other arm of the branch. Specifically in R4, the previous execution took the then branch and the current execution is taking the else branch. As a result, the branch can be marked as covered. In R4' and R5' the next branch to be executed matches the predicted branch on the coverage stack, and the processing system proceeds by just moving the pos marker to the next branch. It is possible that the predicted branch on top of the coverage stack does not match the current branch, in which case the term is "stuck." When "stuck" occurs, the processing system can detect it and restart the testing algorithm with a different set of random inputs. R4" and R5" denote the cases where the branches are being covered for the first time with the current path prefix, and coverage stack (CS) is updated by noting that both arms of these branches are not covered.

Semantic rule R2 states: at every statement x:=input( ) a mapping x→$\alpha_x$ is introduced from the variable x to a fresh symbolic value $\alpha_x$. Semantic rule R4 states: at every assignment x:=e, the symbolic environment is updated with mapping of x to the symbolic expression obtained by evaluating e in the current symbolic memory.

Assume eval_concolic is an implementation of the concolic semantics given above in FIG. 8. It has following signature:

$$\text{eval\_concolic: S} \times \text{IL} \times \text{CoverageStack} \rightarrow \text{PathConstraints} \times \text{CoverageStack} \quad (3)$$

eval_concolic initializes the PathConstraints to nil, VEnv to φ and SEnv to φ and uses the semantic rules above to implement the rest.

Given the concolic program execution semantics, the generic concolic testing generates a new test as follows. It selects a conditional 1: if(e) then S1 else S2 along the path that was executed such that (1) the current execution took the "then" (respectively, "else") branch of the conditional, and (2) the "else" (respectively, "then") branch of this conditional is uncovered. Let P' be the symbolic constraint just before executing this instruction and P be the constraint generated by the execution of conditional instruction e. Using a decision procedure, concolic testing finds a satisfying assignment for the constraint P'∧¬(P). The property of a satisfying assignment is that if these inputs are provided at each input statement, then the new execution will follow the old execution up to the beginning of the branch, but then takes the conditional branch opposite to the one taken by the old execution, thus ensuring that the other branch gets covered. FIG. 9 shows an example of a function solve_path_constraints 900 that uses the satisfying assignment to define a new input list for the next run of the program. FIG. 9 also shows an example of a concolic testing algorithm 910 that performs the generic concolic testing using the input list generated by the function solve_path_constraints 900.

Property Testing Semantics and Property Testing Algorithm

Embodiments of the present invention extend the generic concolic testing described above in FIGS. 8 and 9. According to one embodiment of the present invention, three additional pieces of information are collected by a processing system during each execution (i.e., iteration) of a program:

(1) Property state of the program at every execution step during runtime. This property state is changed only by the stateChange operation. In some embodiments, the property state is collected at a branch point and a merge point of every branch.

(2) A set of non-relevant branches. If an arm of a branch does not change the property state, then the set is updated.

(3) A map from each branch to the corresponding property state in the execution.

FIG. 10 shows an embodiment of the full semantics for property testing. The terms in bold show the extra terms for property testing (as compared to the concolic execution semantics in FIG. 8). With respect to (1), a property state (referred to as P) of the system is introduced in the semantics. This property state, an integer in this formulation, can be modified only by the stateChange operation. In each execution of the program, the current property state of the program is maintained at every execution step. With respect to (2), a set of non-relevant branches (referred to as NRB in the syntax) is maintained and updated at every execution step. To compute relevancy, a processing system determines whether an arm of a branch changes the property state or not. The processing system makes the determination based on the knowledge of the property state at the beginning of the branch execution. The property state at the beginning of the branch execution can be obtained by maintaining a property state stack (referred to as PS in the syntax) at every execution step.

In one embodiment, a processing system starts the execution of a branch by pushing the current property state onto the stack (see R4, R4', R4", R5, R5', R5" in FIG. 10) and adding the pop operation to the body of the branch at the end. When the processing system executes the pop operation, it checks whether the current property state is the same as the top of the stack. If the property state stays the same, then the processing system adds the current branch to the set of non-relevant branches for that property state (see R6, R7). These non-relevant branches are intended to be updated and reused over many executions of the program in the testing algorithm. With respect to (3), a mapping is introduced from branches to property states (referred to as BPM) to maintain the property state for a branch in an execution. Overall, the different terms in the semantics and their meanings are as follows:

VEnv Variable environment
SEnv Symbolic Var Environment
ζ Path constraint
CS coverage stack
PS property state stack for figuring out the relevancy of a branch
BPM mapping from branches to property state in the current execution
NRB records not relevant branches over all previous executions
P current property state
IL input list
S statement in the program The property testing semantics described above with reference to FIG. 10 can be implemented by a function property_test_semantics with the following signature:

$$S \times IL \times CoverageStack \times NRB \rightarrow PathConstraints \times CoverageStack \times BPM \times NRB, \quad (4)$$

where property_test_semantics initializes the PathConstraints to nil, VEnv to φ, SEnv to φ, PS to pos, BPM to φ, P to 0 and uses the semantic rules in FIG. 10 to implement the rest.

FIG. 11 illustrates an example of a function solve_path_constraints 1100. A main difference between the function solve_path_constraints 900 (in FIG. 9) and solve_path_constraints 1100 is in the latter function's use of non-relevant branches (NRB). The function solve_path_constraints 1100 not only looks for an uncovered branch (whose negation has not been explored) but also checks that both arms of the uncovered branch are relevant branches. FIG. 11 also shows an example of a property testing algorithm 1120 that performs the property testing using the input list generated by the function solve_path_constraints 1100.

An Example of a Computer System

Figure 12:
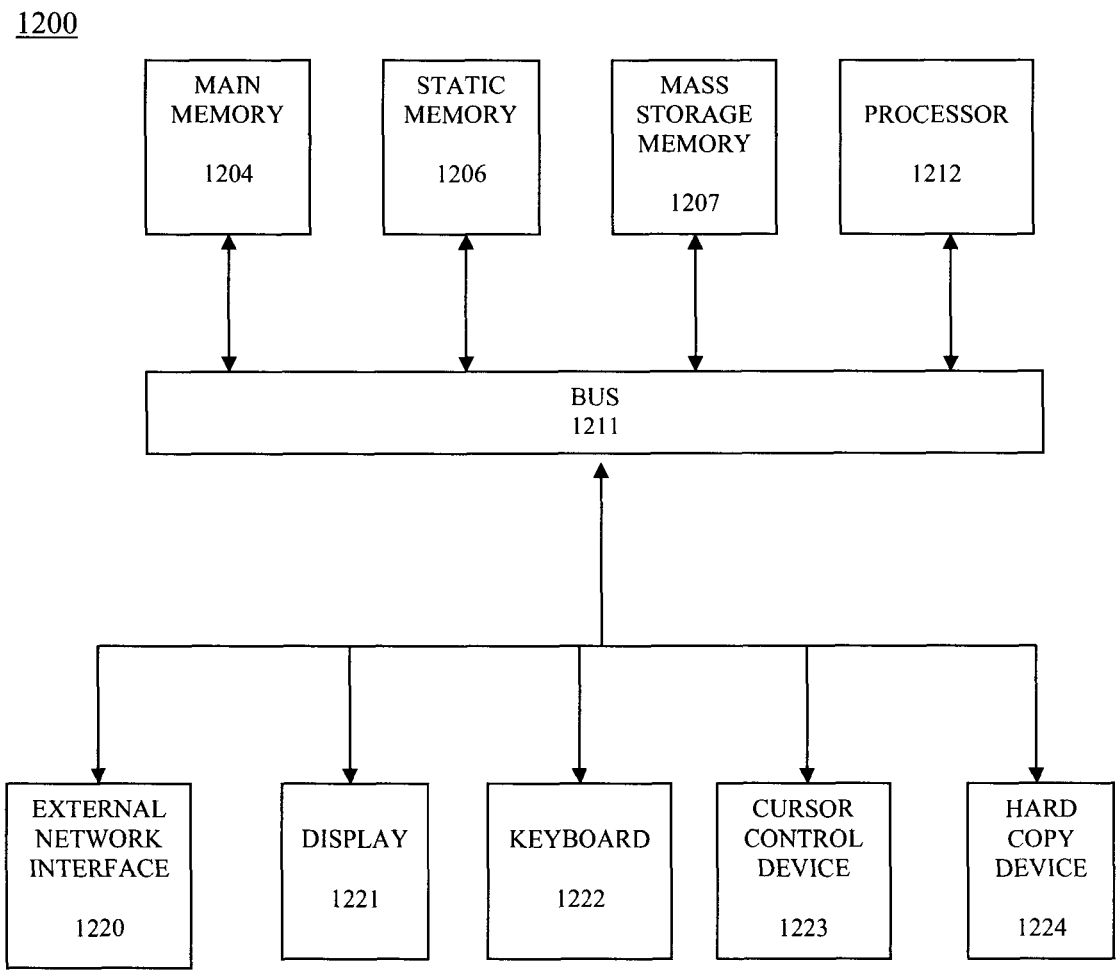
FIG. 12 is a block diagram of one embodiment of a computer system.

FIG. 12 is a block diagram of an exemplary computer system that may perform one or more of the operations described herein. Referring to FIG. 12, computer system 1200 may comprise an exemplary client or server computer system. Computer system 1200 comprises a communication mechanism or bus 1211 for communicating information, and a processor 1212 coupled with bus 1211 for processing information. Processor 1212 includes a microprocessor, but is not limited to a microprocessor, such as, for example, Pentium™, PowerPC™, Alpha™, etc.

System 1200 further comprises a random access memory (RAM), or other dynamic storage device 1204 (referred to as main memory) coupled to bus 1211 for storing information and instructions to be executed by processor 1212. Main memory 1204 also may be used for storing temporary variables or other intermediate information during execution of instructions by processor 1212.

Computer system 1200 also comprises a read only memory (ROM) and/or other static storage device 1206 coupled to bus 1211 for storing static information and instructions for processor 1212, and a data storage device 1207, such as a magnetic disk or optical disk and its corresponding disk drive. Data storage device 1207 is coupled to bus 1211 for storing information and instructions.

Computer system 1200 may further be coupled to a display device 1221, such as a cathode ray tube (CRT) or liquid crystal display (LCD), coupled to bus 1211 for displaying information to a computer user. An alphanumeric input device 1222, including alphanumeric and other keys, may also be coupled to bus 1211 for communicating information and command selections to processor 1212. An additional user input device is cursor control 1223, such as a mouse, trackball, trackpad, stylus, or cursor direction keys, coupled to bus 1211 for communicating direction information and command selections to processor 1212, and for controlling cursor movement on display 1221.

Another device that may be coupled to bus 1211 is hard copy device 1224, which may be used for marking information on a medium such as paper, film, or similar types of media. Another device that may be coupled to bus 1211 is a wired/wireless communication capability 1225 to communication to a phone or handheld palm device. System 1200 may also include an external network interface 1220 for providing network connections to external devices.

Note that any or all of the components of system 1200 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for generating test inputs for testing an application, the method comprising:
   executing, by a processing system, an application using test input values that are generated for testing the application with respect to a property of interest;
   collecting one or more constraints among symbolic variables of the application;
   determining whether a branch in the application is relevant to the property;
   generating new test input values based on the constraints and branch relevancy; generating, by a processing system, new test inputs for a next iteration based on test values of a current iteration and symbolic constraints collected during the current iteration; and
   pruning execution paths using runtime generated information that includes relevancy of a plurality of branches in the application with respect to the property of interest.

2. The method of claim 1, further comprising:
   for every branch of the application, collecting a first property state at a branch point and a second property state at a merge point.

3. The method of claim 2, further comprising:
   pushing the first property state into a property state stack at the branch point;
   popping the first property state from the property state stack at the merge point; and
   comparing the first property state popped from the property state stack with the second property state.

4. The method of claim 1, further comprising:
   comparing a first property state collected at a branch point of the branch with a second property state collected at a merge point of the branch; and
   marking an arm of the branch non-relevant when the first property state is the same as the second property state, the arm being executed in a current iteration of the application.

5. The method of claim 1, wherein generating new test input values further comprises: using constraints such that a branch will be negated only if it is determined to be non-relevant, and
in response to a determination that the branch is non-relevant, generating the new test inputs using the constraints such that the branch will be not flipped in subsequent iterations of the application.

6. The method of claim 1, wherein determining whether a branch in the application is relevant further comprises:
   determining the branch as non-relevant when both arms of the branch do not change a property state.

7. The method of claim 1, further comprising:
   negating a constraint in the application only if a corresponding branch of the constraint has not been determined to be non-relevant.

8. The method of claim 1, further comprising:
   repeating execution of the application with automatically generated test inputs until all paths corresponding to relevant branches have been explored and no new path constraints are generated.

9. The method of claim 1, further comprising:
   executing a loop that comprises a plurality of loop iterations, each loop iteration containing a looped branch; and
   labeling the loop branches with a same loop label in determining relevancy of the looped branch.

10. The method of claim 9, wherein the loop includes a single looped branch, the method further comprising:
    covering the loop within two iterations when it is detected that the looped branch does not affect a property state.

11. The method of claim 1, further comprising:
    identifying a change to a guard value within a given branch, the guard value controlling a direction of at least one of branches in the application; and
    counting the change to the guard value as a change to a property state.

12. The method of claim 1, further comprising:
    updating a set of non-relevant branches when it is determined that an arm of a given branch does not change a property state.

13. The method of claim 1, further comprising:
    maintaining a map from each branch of the application to a corresponding property state in the execution.

14. The method of claim 1, further comprising:
    for every branch of the application, recording a property state at least at a branch point and a merge point.

15. The method of claim 1, further comprising:
    determining a branch as non-relevant when both arms of the branch do not change a property state.

16. An article of manufacture having one or more non-transitory computer readable storage media storing instructions therein which, when executed by a system, causes the system to perform a method comprising:
    executing, by a processing system, an application using test input values that are generated for testing the application with respect to a property;
    collecting one or more constraints among symbolic variables of the application during execution;
    determining whether a branch in the application is relevant to the property; and
    generating new test input values based on the constraints and branch relevancy; pruning execution paths of the application using runtime generated information that includes the branch relevancy.

17. The article of manufacture of claim 16, wherein the method further comprises:
    pruning execution paths of the application using runtime generated information that includes the branch relevancy.

18. The article of manufacture of claim 16, wherein determining whether a branch in the application is relevant further comprises:
   determining the branch as non-relevant when both arms of the branch do not change a property state.

19. The article of manufacture of claim 16, wherein determining whether a branch in the application is relevant further comprises:
   comparing a first property state collected at a branch point of the branch with a second property state collected at a merge point of the branch.

* * * * *